United States Patent
Inoue

(10) Patent No.: US 10,487,976 B2
(45) Date of Patent: Nov. 26, 2019

(54) FIXING MEMBER AND EXTENDABLE MEMBER PROVIDED WITH THE FIXING MEMBER

(71) Applicant: YAMAHA CORPORATION, Hamamatsu-shi (JP)

(72) Inventor: Hideyuki Inoue, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 0 days.

(21) Appl. No.: 15/890,410

(22) Filed: Feb. 7, 2018

(65) Prior Publication Data
US 2018/0274718 A1    Sep. 27, 2018

(30) Foreign Application Priority Data
Mar. 23, 2017  (JP) ................. 2017-057303

(51) Int. Cl.
*F16M 11/00*  (2006.01)
*F16M 11/28*  (2006.01)
(Continued)

(52) U.S. Cl.
CPC .......... *F16M 11/28* (2013.01); *A47B 19/002* (2013.01); *F16B 2/10* (2013.01); *F16B 7/1472* (2013.01);
(Continued)

(58) Field of Classification Search
CPC ....................................................... F16B 2/10
See application file for complete search history.

(56) References Cited

U.S. PATENT DOCUMENTS

| 4,767,131 A | * | 8/1988 | Springer | ................. | A61G 5/10 248/316.2 |
| 5,868,538 A | * | 2/1999 | Rathbun | ................. | D01H 7/16 411/433 |

(Continued)

FOREIGN PATENT DOCUMENTS

| JP | S6021012 U | 2/1985 |
| JP | 3008932 U | 3/1995 |

(Continued)

OTHER PUBLICATIONS

Office Action issued in Japanese Appln. No. 2017-057303 dated Feb. 12, 2019. English machine translation provided.

(Continued)

*Primary Examiner* — Amy J. Sterling
(74) *Attorney, Agent, or Firm* — Rossi, Kimms & McDowell LLP

(57) ABSTRACT

A fixing member includes a supporting member that supports a first bar member in the longwise direction thereof; a pivoting member that has an opening portion that the first bar member penetrates and that is attached to the supporting member to freely pivot about a rotation axis that is perpendicular to the longwise direction of the first bar member; and a fastening member that causes the pivoting member to pivot centered on the rotation axis, in which the pivoting member does not make contact with the first bar member when in a first position; the pivoting member makes contact with the first bar member when in a second position; and the fastening member fixes the pivoting member to either the first position or the second position.

8 Claims, 3 Drawing Sheets

(51) Int. Cl.
    *F16B 2/10*     (2006.01)
    *A47B 19/00*     (2006.01)
    *F16B 7/14*     (2006.01)
    *G10G 5/00*     (2006.01)
    *F16B 2/06*     (2006.01)

(52) U.S. Cl.
    CPC .......... *G10G 5/00* (2013.01); *A47B 2019/008* (2013.01); *F16B 2/065* (2013.01); *F16M 2200/027* (2013.01)

(56) References Cited

U.S. PATENT DOCUMENTS

| | | | | |
|---|---|---|---|---|
| 7,216,400 | B2 * | 5/2007 | Hodson | E05F 3/221 |
| | | | | 16/66 |
| 7,614,835 | B2 * | 11/2009 | Kitamura | F16B 37/0857 |
| | | | | 24/656 |
| 8,167,259 | B2 * | 5/2012 | Spang, Jr. | A61M 39/283 |
| | | | | 248/218.4 |

FOREIGN PATENT DOCUMENTS

| | | | |
|---|---|---|---|
| JP | H09146543 | A | 6/1997 |
| JP | 2005114161 | A | 4/2005 |

OTHER PUBLICATIONS

Office Action issued in Japanese Appln. No. 2017-057303 dated Apr. 16, 2019. English machine translation provided.

\* cited by examiner

FIXING MEMBER AND EXTENDABLE MEMBER PROVIDED WITH THE FIXING MEMBER

Priority is claimed on Japanese Patent Application No. 2017-057303, filed Mar. 23, 2017, the content of which is incorporated herein by reference.

BACKGROUND OF THE INVENTION

Field of the Invention

The present invention relates to a fixing member that is detachably provided to a bar-shaped support column, and an extendable member that is provided with the fixing member.

Description of Related Art

In many musical instruments, a fixing member that is detachably provided to a bar-shaped support column is employed. The fixing member is movable (slidable) along the support column, and can be affixed at an arbitrary position of the support column. For that reason, the positional relation of the fixing member with the support column can be easily adjusted in the range in which the fixing member is capable of moving along the support column.

For example, the fixing member is used for an extendable stand (extendable member) that holds a music stand or microphone or the like. The extendable stand is provided with at least a support column that holds the music stand or microphone, and a leg portion that has the fixing member. The longwise direction of the support column is vertical, and the support column is supported by the leg portion so as to be capable of moving vertically in the longwise direction. By the support column and the fixing member of the leg portion being fixed, the support column is fixed to be vertically immovable relative to the leg portion.

In order to adjust the height position of the support column that holds the music stand or microphone, the user releases the fixation between the support column and the fixing member of the leg portion, vertically moves the fixing member along the support column, and affixes the fixing member to a position of the support column. As a result, it is possible to adjust the height position of the support column with respect to the leg portion having the fixing member. Since the height position at which a music stand or microphone is held differs depending on the user, it is necessary to provide a position adjustment function using such a fixing member in an extendable stand that holds the music stand or microphone.

The fixation between the support column and the fixing member in such a fixing member often uses the fastening force from a screw such as a butterfly bolt (wing bolt). Japanese Unexamined Patent Application No. H09-146543 discloses a joint member (fixing member) that holds a stand shaft (support column) by fastening with a butterfly bolt. The user can easily perform position adjustment of a musical instrument supported by the stand shaft.

However, when using the fastening force provided by a screw such as a butterfly bolt (wing bolt) for the fixation between the support column and the fixing member, the fastening force provided by the screw falls due to wear of the screw and deterioration over time. When the fastening force by the screw falls, slippage between the support column and the fixing member occurs due to loosening of the screw.

SUMMARY OF THE INVENTION

The present invention was achieved in view of the aforementioned circumstances, and has as its object to provide a fixing member that is detachably provided to a bar-shaped support column and by which slippage does not easily occur when affixed to the support column, and an extendable member that is provided with the fixing member.

This invention provides the following means in order to solve the aforementioned problem.

The fixing member according to the present invention is provided with a supporting member that supports a first bar member in the longwise direction thereof; a pivoting member that has an opening portion that the first bar member penetrates and that is attached to the supporting member to freely pivot about a rotation axis that is perpendicular to the longwise direction of the first bar member; and a fastening member that causes the pivoting member to pivot centered on the rotation axis, in which the pivoting member does not make contact with the first bar member when in a first position; the pivoting member makes contact with the first bar member when in a second position; and the fastening member fixes the pivoting member to either the first position or the second position.

The extendable member according to the present invention is provided with the fixing member, the first bar member, and a second bar member of which one end is affixed to the supporting member.

According to the present invention, it is possible to provide a fixing member that is detachably provided to a bar-shaped support column and by which slippage does not easily occur when affixed to the support column, and an extendable member that is provided with the fixing member.

DETAILED DESCRIPTION OF THE INVENTION

Hereinbelow, one embodiment of the fixing member and the extendable member according to the present invention will be described while referring to FIG. 1 to FIG. 4. In each of the drawings, the thickness and dimensional ratio of each constituent element is appropriately adjusted in order to make each drawing easy to see.

Figure 1:
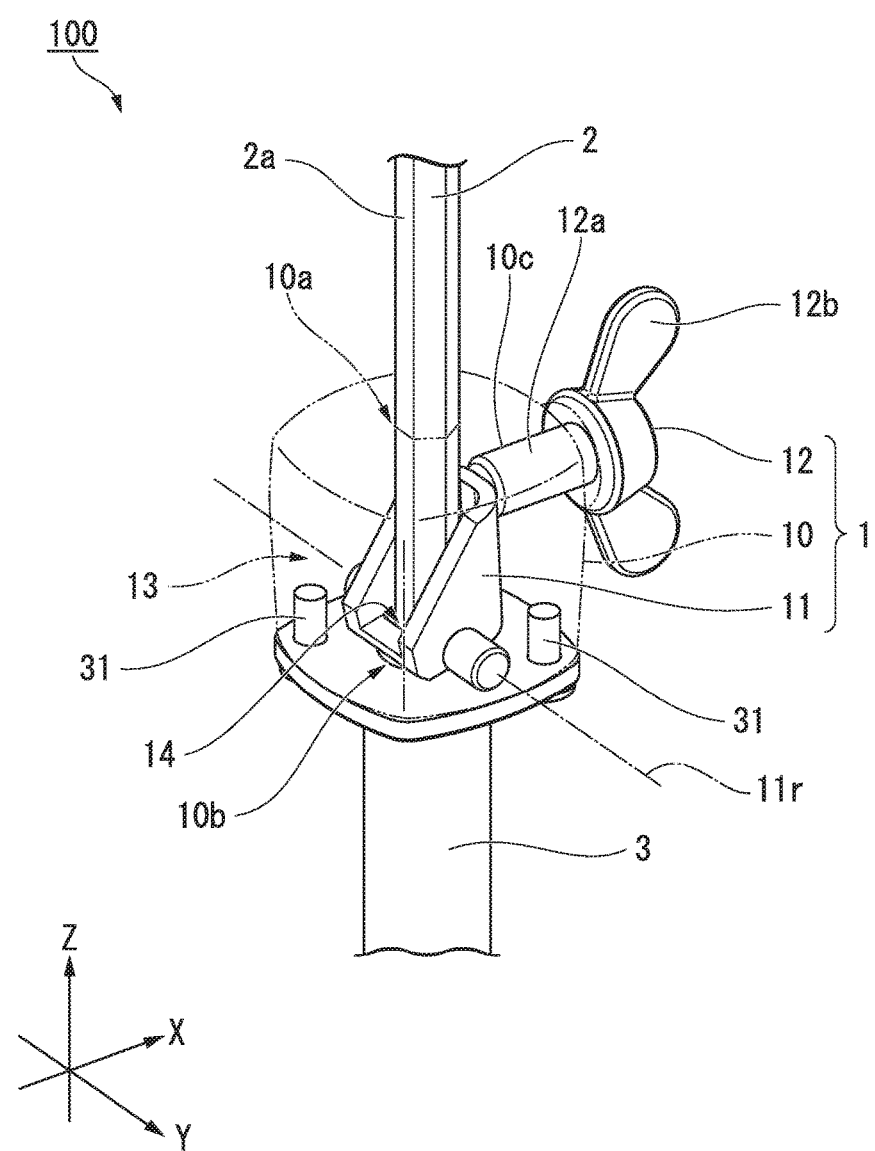
FIG. 1 is a perspective drawing showing the fixing member and the extendable member according to one embodiment of the present invention.

FIG. 1 is a drawing that shows the overall constitution of a fixing member 1 and an extendable member 100 of the present embodiment.

As shown in FIG. 1, the extendable member 100 of the present embodiment is provided with the fixing member 1, a first bar member 2, and a second bar member 3. The fixing member 1 according to the present embodiment is also provided with a cover (supporting member) 10, a clutch (pivoting member) 11, and a butterfly bolt (fastening member) 12.

The fixing member 1 is a member that is detachably provided to the first bar member 2. The fixing member 1 can move (slide) along the first bar member 2, and can be affixed to an arbitrary position of the first bar member 2.

The first bar member 2 is a bar member whose cross-sectional shape in the longwise direction is a regular hexagon. The cross-sectional shape and dimension of the first bar member 2 are formed so as to be the same at any position in the longwise direction.

In the following description, as shown in FIG. 1, the central axis of the first bar member 2 in the longwise direction is called the Z axis.

The cover 10 is a case to which the clutch 11 and the butterfly bolt 12 described below are attached, as shown in FIG. 1. The cover 10 has a cover cavity 13, and the cover cavity 13 communicates with the external space at the three locations of a first opening 10a, a second opening 10b, and a female screw 10c.

By reducing the insertion locations between the cover cavity 13 and the external space, it is possible to prevent foreign objects from entering the cover cavity 13 in which the clutch 11 and the like described below are disposed, and it is possible to prevent malfunction of the clutch 11.

The first opening 10a and the second opening 10b are openings which the first bar member 2 penetrates. The first opening 10a and the second opening 10b are provided at opposing portions on both sides in a manner sandwiching the cover cavity 13, and the first bar member 2 can penetrate both the first opening 10a and the second opening 10b.

The shapes of the first opening 10a and the second opening 10b are slightly larger than the cross-sectional shape of the first bar member. Therefore, when the first bar member 2 penetrates both the first opening 10a and the second opening 10b, there is only a slight space between the first bar member 2 and the first opening 10a and between the first bar member 2 and the second opening 10b. That is, the first opening 10a and the second opening 10b function as guides supporting the first bar member 2 so as to be movable in the Z-axis direction.

Figure 2A:
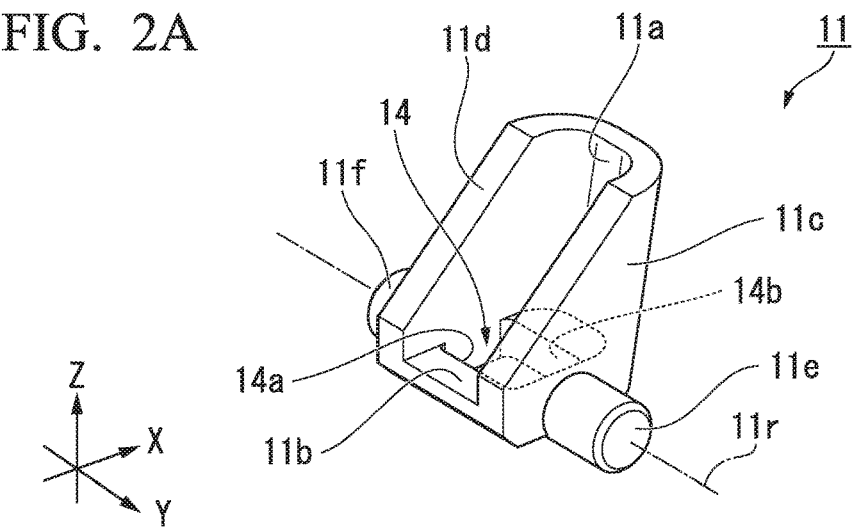
FIGS. 2A, 2B, 2C are, respectively, a perspective view, front view, and plan view of the clutch of the fixing member according to one embodiment of the present invention.
Figure 2B:
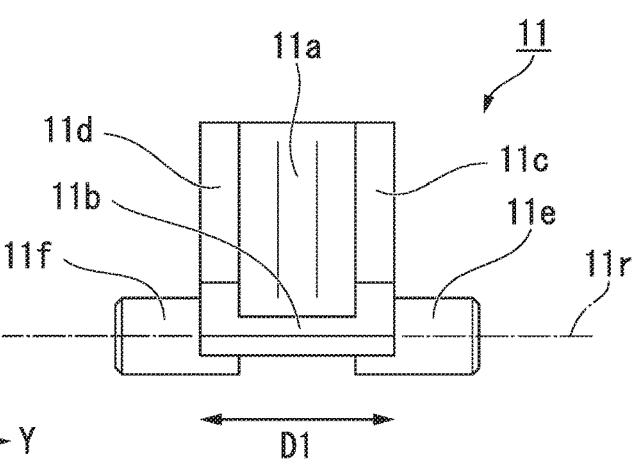
Figure 2C:
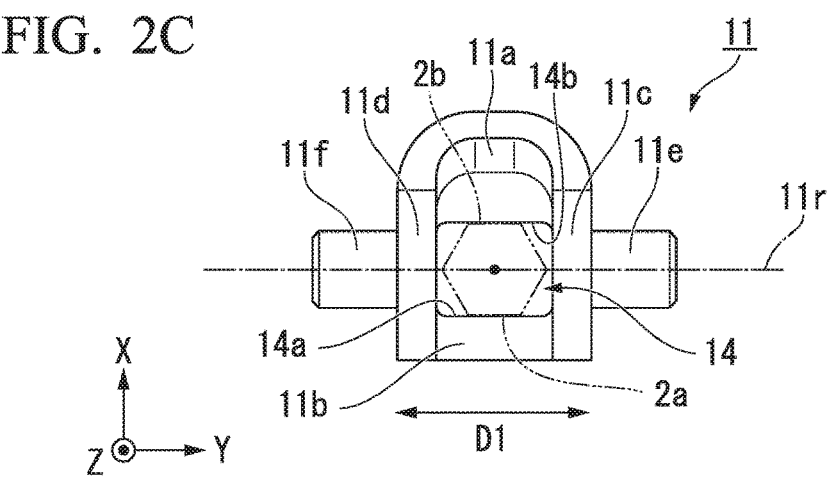

FIGS. 2A, 2B and 2C are drawings showing the clutch 11. FIG. 2A is a perspective view of the clutch 11. FIG. 2B is a front view of the clutch 11. FIG. 2C is a plan view of the clutch 11.

The clutch 11 is a member that is attached to the cover 10 in a freely pivoting manner about a rotation axis 11r. As shown in FIGS. 2A, 2B and 2C, the clutch 11 is constituted from a back face portion 11a, a bottom face portion 11b, a right-side face portion 11c, a left-side face portion 11d, a right projection portion 11e, and a left projection portion 11f.

The back face portion 11a, the bottom face portion 11b, the right-side face portion 11c, and the left-side face portion 11d constitute the four side faces of the inner cavity of the clutch 11.

The back face portion 11a, as shown in FIG. 2B, is formed in a plate-like shape, and has an approximately rectangular shape (in the Y-Z planes) viewed in the plate thickness direction, with the length of the short side being D1.

The bottom face portion 11b, as shown in FIG. 2C, is formed in a plate-like shape, and has an approximately rectangular shape (in the X-Y planes) viewed in the plate thickness direction, with the length of the short side being D1.

The back face portion 11a and the bottom face portion 11b are mutually joined at the short side of length D1. The back face portion 11a and the bottom face portion 11b form an angle of 90° to 120°.

As shown in FIGS. 2A, 2B and 2C, the right-side face portion 11c and the left-side face portion 11d are side plates formed perpendicularly to both the back face portion 11a and the bottom face portion 11b. The right-side face portion 11c and the left-side face portion 11d are parallel.

The cylindrical right projection portion 11e is formed projecting to the outside in the plate thickness direction of the right-side face portion 11c. That is, the right projection portion 11e is formed on the surface on the opposite side of the surface of the right-side face portion 11c on which the back face portion 11a and the bottom face portion 11b are formed.

The cylindrical left projection portion 11f is formed projecting to the outside in the plate thickness direction of the left-side face portion 11d. That is, the left projection portion 11f is formed on the surface on the opposite side of the surface of the left-side face portion 11d on which the back face portion 11a and the bottom face portion 11b are formed.

The right projection portion 11e and the left projection portion 11f are cylindrical members with the same dimensions. The respective center axes coincide, and this center axis becomes the rotation axis 11r of the clutch 11.

In the inner wall of the cover 10, a right concave portion and a left concave portion are formed at opposing portions on both sides in a manner sandwiching the cover cavity 13. The right projection portion 11e and the left projection portion 11f engage with the right concave portion and the left concave portion, respectively.

By the engagement of the right projection portion 11e and the right concave portion, and the engagement of the left projection portion 11f and the left concave portion, the clutch 11 is attached to the cover 10 in a freely pivoting manner about the rotation axis 11r.

In the present embodiment, the left concave portion and the right concave portion are formed in the interior portion of the cover 10 so that the rotation axis 11r coincides with the Y axis, which is perpendicular with the Z axis. The clutch 11 freely pivots centered on the Y axis. In the following description, the axis perpendicular with the Z axis and the Y axis is called the X axis.

As shown in FIG. 2C, an opening portion 14 that penetrates in the thickness direction is formed in the bottom face portion 11b. When viewed in the thickness direction, the opening portion 14 is formed in a square shape with the four sides thereof parallel with the X axis or the Y axis.

A first inner wall 14a and a second inner wall 14b that opposes the first inner wall 14a are formed in the opening portion 14, along the thickness direction of the bottom face portion 11b.

In the present embodiment, the first inner wall 14a and second inner wall 14b are opposed to each other in parallel, and are positioned on both sides across a plane that includes the rotation axis 11r and the Z axis.

As shown in FIG. 2C, the first bar member 2 penetrates the opening portion 14 of the bottom face portion 11b. The cross-sectional shape of the first bar member 2 is a regular hexagon in the longwise direction, with the first bar member 2 having three pairs of parallel sides. The first bar member 2 is guided by the first opening 10a and the second opening 10b of the cover 10 so that one pair of parallel sides of the first bar member 2 respectively oppose in parallel the first inner wall 14a and the second inner wall 14b. Here, the side face of the first bar member 2 that opposes the first inner wall 14a is called the first side face 2a, and the side face of the first bar member 2 that opposes the second inner wall 14b is called the second side face 2b.

The clutch 11 pivots centered on the rotation axis 11r, to be arranged at either a position that does not make contact with the first bar member 2 (first position) or a position that makes contact with the first bar member 2 (second position).

Figure 3:
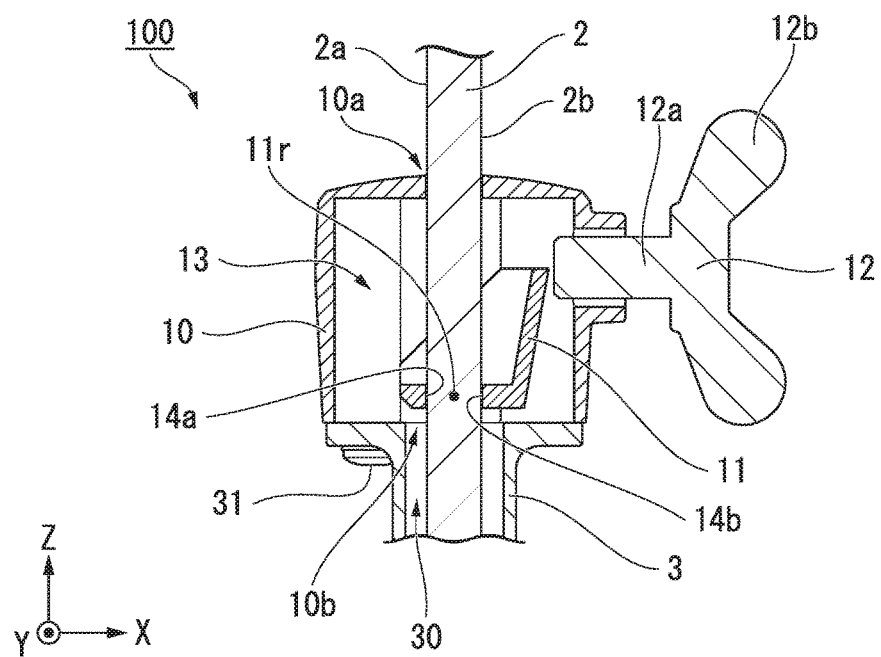
FIG. 3 is a cross-sectional view showing the extendable member when the clutch of the fixing member according to one embodiment of the present invention is in the first position.

FIG. 3 is a cross-sectional view of the extendable member 100 in the case of the clutch 11 being in the first position.

When the clutch 11 is in the first position, the first side face 2a of the first bar member 2 and the first inner wall 14a are opposed to each other in parallel, sandwiching a small gap therebetween. Similarly, the second side face 2b of the first bar member 2 and the second inner wall 14b are opposed to each other in parallel, sandwiching a small gap therebetween.

As shown in FIG. 3, when the clutch 11 is in the first position, the first bar member 2 and the clutch 11 do not make contact, with the first bar member 2 being movable in the Z-axis direction relative to the clutch 11.

Figure 4:
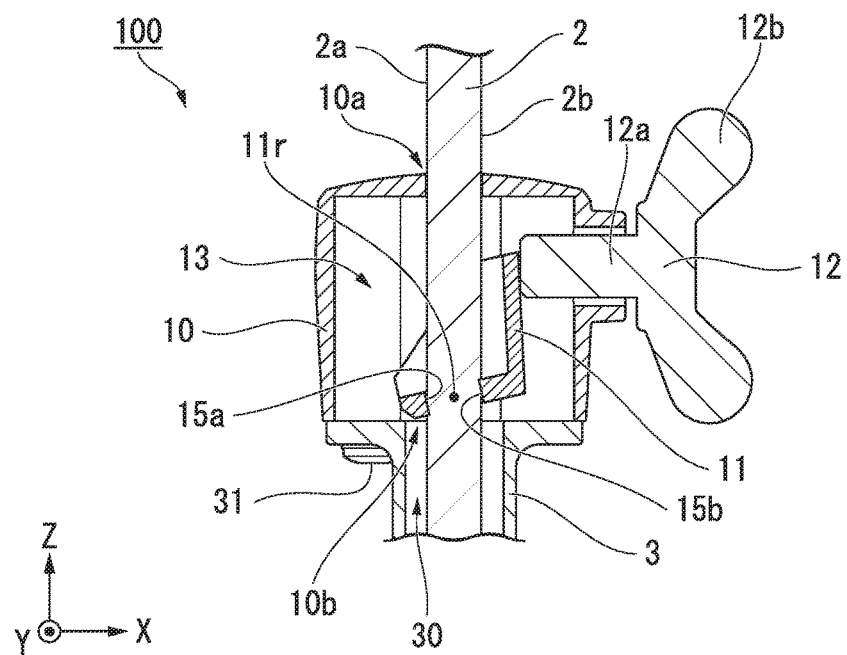
FIG. 4 is a cross-sectional view showing the extendable member when the clutch of the fixing member according to one embodiment of the present invention is in the second position.

FIG. 4 is a cross-sectional view of the extendable member 100 in the case of the clutch 11 being in the second position.

As shown in FIG. 4, when the clutch 11 is pivoted about the rotation axis 11r to be moved to the second position, the first side face 2a of the first bar member 2 and the first inner wall 14a make contact at a first contact face 15a. Also, the second side face 2b of the first bar member 2 and the second inner wall 14b make contact at a second contact face 15b.

As shown in FIG. 4, when the clutch 11 is in the second position, the first bar member 2 and the clutch 11 make contact at the first contact face 15a and the second contact face 15b.

The first bar member 2 and the clutch 11 can be more firmly fixed to each other by bringing the first bar member 2 and the clutch 11 into contact so that the surface area of the first contact face 15a and the second contact face 15b may become larger.

That is, when the clutch 11 is in the second position, the first bar member 2 and the clutch 11 make contact, and the bar member 2 becomes immovable in the Z-axis direction relative to the clutch 11.

That is, the clutch 11 is a mechanism that converts a force by the butterfly bolt 12 described below that causes the clutch 11 to pivot to a force that clamps the first bar member 2.

In the present embodiment, the first inner wall 14a and the second inner wall 14b of the opening portion 14 are opposed to each other in parallel and positioned in line symmetry with respect to the rotation axis 11r, as shown in FIG. 2C.

In the present embodiment, moreover since the rotation axis 11r coincides with the Y axis, which is perpendicular with the Z axis (the center axis of the first bar member 2), the first contact surface 15a and the second contact surface 15b have a nearly line symmetrical shape with respect to the rotation axis 11r.

Therefore, the first contact surface 15a and the second contact surface 15b have nearly the same surface area, and the first bar member 2 receives forces of nearly the same intensity in opposite directions from the first contact surface 15a and the second contact surface 15b.

As a result, the first bar member 2 is clamped by opposing forces of nearly equal intensity from regions (the first contact surface 15a and the second contact surface 15b) whose positions in the Z-axis direction are nearly the same. The first bar member 2 is stably fixed by the clutch 11 with such a structure.

Here, it is preferred that the first inner wall 14a and the second inner wall 14a of the clutch 11 be positioned as close to each other as possible. This is because the closer the first inner wall 14a and the second inner wall 14a are positioned to each other, the nearer the first contact surface 15a and the second contact surface 15b become in the Z-axis direction, whereby it is possible to more perpendicularly clamp the first bar member 2 in the X-axis direction, and possible to more stably fix the first bar member 2.

As shown in FIG. 1, the butterfly bolt 12 has a male screw 12a that engages with the female screw 10c formed in the cover 10, and a handle 12b attached to the end of the male screw 12a. The handle 12b of the butterfly bolt 12 is provided at the end of the male screw 12a, and it is possible to rotate the male screw 12a centered on the center axis of the male screw 12a without using a separate tool.

The female screw 10c of the cover 10 is formed in the X-axis direction, and by causing the male screw 12a of the butterfly bolt 12 to rotate, the male screw 12a advances and retreats in the X-axis direction.

By causing the male screw 12a to advance along the X axis toward the cover cavity 13, the male screw 12a makes contact with the back face portion 11a if the clutch that is at the first position. As shown in FIG. 4, by causing the male screw 12a to further advance in the direction in which the back face portion 11a is positioned, it is possible to cause the clutch 11 to pivot centered on the rotation axis 11r and move the clutch 11 to the second position. By causing the male screw 12a to further advance, the surface area of the first contact face 15a and the second contact face 15b further increases, whereby it is possible to more firmly fix the first bar member 2 and the clutch 11.

By causing the male screw 12a to retreat along the X axis in the direction opposite the cover cavity 13, the male screw 12a no longer makes contact with the back face portion 11a of the clutch 11. The force bringing the first side 2a of the first bar member 2 and the first inner wall 14a into contact is released, and the force bringing the second side 2b of the first bar member 2 and the second inner wall 14b into contact is released. As a result, as shown in FIG. 3, the clutch 11 pivots centered on the rotation axis 11r, and returns to the first position.

The second bar member 3 is a bar member formed in a tube shape having a hollow region 30, with one end thereof affixed by fixtures 31 to the cover 10 so that the angle formed with the first bar member 2 is almost 0°. Also, the hollow region 30 is in communication with the second opening 10b of the cover 10, whereby the first bar member 2 inserts in the hollow region 30 of the second bar member 3.

When the clutch 11 is at the first position, the first bar member 2 can move along the Z axis relative to the cover 10 and the second bar member. That is, the extendable member 100 can extend and contract along the Z axis.

Next, the operation of the fixing member 1 and the extendable member 100 will be described.

A user rotates the handle 12b of the butterfly bolt 12 of the fixing member 1 to rotate the male screw 12a and thereby cause the male screw 12a to retract in the direction opposite the cover cavity 13, which causes the clutch 11 to move to the first position.

Next, the user moves the first bar member 2, which has become movable in the Z-axis direction with respect to the fixing member 1, relatively in the Z-axis direction. Thereby, the length of the extendable member 100, which is a combination of the first bar member 2 and the second bar member 3, is adjusted.

After the length adjustment is completed, the user rotates the handle 12b of the butterfly bolt 12 of the fixing member 1 to rotate the male screw 12a and thereby cause the male screw 12b to advance in the direction of the cover cavity 13, which causes the clutch 11 to move to the second position.

The first bar member is firmly affixed with the clutch 11. The first bar member 2 thus becomes immovable in the Z-axis direction relative to the clutch 11.

The fixing member 1 of the present embodiment constituted in the aforementioned manner has a mechanism (clutch 11) that converts the pivoting force received from the butterfly bolt 12 to a force for clamping the first bar member 2. With this mechanism, the fixing member 1 clamps the first bar member 2 and fixes the first bar member 2.

Compared to a method that fastens with one screw as in the prior art, it is possible to stably affix the first bar member 2.

In addition, in the fixing member 1 of the present embodiment, the first inner wall 14a and a second inner wall 14b are opposed in parallel, and positioned in line symmetry with respect to the rotation axis 11r. Moreover, the rotation axis 11r coincides with the Y axis. For that reason, the first bar member 2 is clamped by opposing forces of nearly equal intensity at regions (the first contact face 15a and the second contact face 15b) whose positions are nearly the same in the Z-axis direction. The first bar member 2 is stably affixed to the clutch 11 with such a structure.

The length of the extendable member 100 provided with such a supporting member can be easily adjusted, and when the fixing member 1 is affixed to the first bar member 2, slippage does not easily occur.

The extendable member 100 can be favorably used as an extendable member attached to a damper pedal used in a percussion instrument such as a chime or a vibraphone.

Length adjustment of an extendable member attached to the damper pedal is carried out for each user, whereby the position of the damper pedal is adjusted. During a performance, the extendable member works to transmit the operation of the damper pedal to the damper member of the instrument. The operation direction and the extending direction of the bar member that is extended/contracted by the extendable member coincide. In this kind of extendable member, it is necessary to further prevent slippage between the bar member and the fixing member due to loosening of the fixing member.

(Modifications)

While one embodiment of the present invention was described in detail above with reference to the drawings, specific constitutions are not limited to this embodiment, and design modifications of a scope not departing from the gist of the present invention are included. It is also possible to achieve a constitution by suitably combining constituent elements shown in the embodiment described above and the modifications given below.

For example, in the embodiment, the cover 10 has the cover cavity 13, and the cover cavity 13 communicates with the external space at the three locations of the first opening 10a, the second opening 10b, and the female screw 10c. However, the mode of the cover is not limited thereto. For example, the cover may be in communication with the external space at the aforementioned three locations and more. The cover need only support the first bar member 2 to be movable in the longwise direction, and be a member to which the clutch 11 is attached in a freely pivoting manner.

In the embodiment, the first inner wall 14a and the second inner wall 14a are positioned on both sides across a plane that includes the rotation axis 11r and the Z axis, but the arrangement configuration of the first inner wall and the second inner wall is not limited thereto. The first inner wall and the second inner wall may be positioned on one side without the plane including the rotation axis 11r and the Z axis being interposed therebetween. If the first bar member 2 can be clamped by the first inner wall and the second inner wall, it is possible to stably fix the first bar member 2.

In the embodiment, the first inner wall 14a and the second inner wall 14b of the opening portion 14 are opposed to each other in parallel, and positioned in line symmetry with respect to the rotation axis 11r. However, the shape and arrangement configuration of the first inner wall and the second inner wall are not limited thereto. For example, the first inner wall and the second inner wall need not be opposed to each other in parallel. If the first bar member 2 can be clamped by the first inner wall and the second inner wall, it is possible to stably fix the first bar member 2. In addition, the first inner wall and the second inner wall need not be positioned in line symmetry with respect to the rotation axis 11r. If both of the first inner wall and the second inner wall can make contact with the first bar member 2, it is possible to clamp and fix the first bar member 2.

In the embodiment, the rotation axis 11r of the clutch 11 coincided with the Y axis (the axis perpendicular with the Z axis), but the constitution of the rotation shaft of the clutch 11 is not limited thereto. For example, the rotation axis of the clutch 11 may be arranged at a position parallel with the Y axis. If the first bar member 2 can be clamped by the first inner wall 14a and the second inner wall 14a by pivoting the clutch 11 centered on the rotation axis of the clutch 11, it is possible to stably fix the first bar member 2.

In the embodiment, the cross-sectional shape of the first bar member 2 is a regular hexagon. However, the shape of the first bar member 2 is not limited thereto. For example, the cross-sectional shape of the first bar member may be square or circular. If the first bar member can be clamped by the first inner wall 14a and the second inner wall 14a, it is possible to fix the first bar member 2. With a first bar member that has two parallel side faces, it is possible to further increase the surface area of the first contact face 15a and the second contact face 15b, and therefore possible to favorably fix the first bar member and the clutch 11.

In the embodiment, the butterfly bolt 12 was used as a member that pivots the clutch 11, but the member that pivots the clutch 11 is not limited thereto. For example, the member that pivots the clutch 11 may be one that pivots the clutch 11 with an L-shaped link mechanism to move the clutch 11 from the first position to the second position, and from the second position to the first position.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fixing member usable with an extendable member, which includes a first bar member and a second bar member, used in a musical instrument, the fixing member comprising:
   a supporting member configured to support the first bar member in a longwise direction thereof, which coincides with a direction in which the extendable member operates during a performance of the musical instrument;
   a pivoting member, including an opening portion dimensioned to receive the first bar member, and supported by the supporting member to be freely pivotable about a rotation axis that is perpendicular to the longwise direction of the first bar member; and a fastening member that causes the pivoting member to pivot on the rotation axis and move the pivoting member to either a first position or a second position, wherein the pivoting member is configured to, when the first bar member is received in the opening portion:

not contact the first bar member when the pivoting member is in the first position; and contact the first bar member when the pivoting member is in the second position, and wherein one end of the second bar member is configured to be attached to the supporting member.

2. The fixing member according to claim 1, wherein:

the opening portion includes a first inner wall and a second inner wall, and when the pivoting member is in the second position, the first inner wall and the second inner wall contact the first bar member.

3. The fixing member according to claim 2, wherein the first inner wall and the second inner wall are positioned on both sides across a plane that includes the rotation axis and the center axis of the first bar member in the longwise direction.

4. The fixing member according to claim 2, wherein the first inner wall and the second inner wall are at symmetrical positions with respect to the rotation axis.

5. The fixing member according to claim 1, wherein the rotation axis is perpendicular to the center axis of the first bar member in the longwise direction.

6. An extendable member used with a musical instrument, the extendable member comprising:

a first bar member movable in a longwise direction, which coincides with a direction in which the extendable member operates during a performance of the musical instrument;

a fixing member comprising:

a supporting member configured to support the first bar member in the longwise direction thereof;

a pivoting member, including an opening portion dimensioned to receive the first bar member, and supported by the supporting member to be freely pivotable about a rotation axis that is perpendicular to the longwise direction of the first bar member; and a fastening member that causes the pivoting member to pivot on the rotation axis and moves the pivoting member to either a first position or a second position, wherein the pivoting member is configured to, when the first bar member is received in the opening portion:

not contact the first bar member when the pivoting member is in the first position; and contact the first bar member when the pivoting member is in the second position; and a second bar member, with one end thereof attached to the supporting member.

7. The extendable member according to claim 6, wherein the first bar member is movable in the longwise direction relative to the fixing member when the pivoting member is in the first position.

8. The extendable member according to claim 6, wherein:

the second bar member is tubular, including a hollow region, and the first bar member is received in the hollow region of the second bar member.

* * * * *